Figure 1:
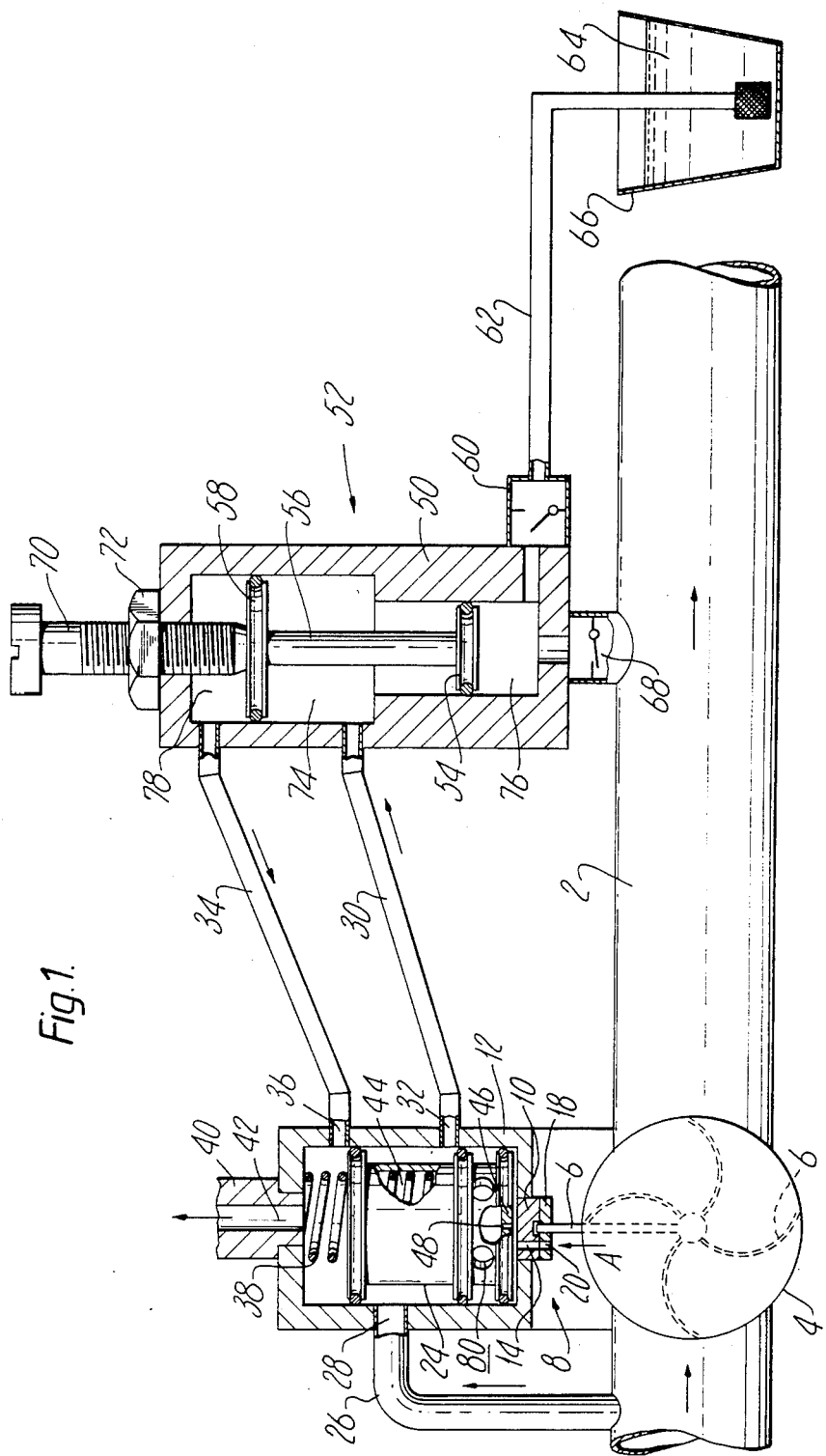

United States Patent [19]
Bron

[11] Patent Number: 4,541,450
[45] Date of Patent: Sep. 17, 1985

[54] LIQUID PROPORTIONING SYSTEM

[76] Inventor: Dan Bron, 36 Palmach St., Haifa, Israel

[21] Appl. No.: 380,895

[22] Filed: May 21, 1982

[30] Foreign Application Priority Data

Jun. 3, 1981 [IL] Israel ........................................ 63029

[51] Int. Cl.⁴ .......................................... G05D 11/035
[52] U.S. Cl. .................... 137/99; 137/101.31; 222/57; 417/349; 417/401; 417/550
[58] Field of Search ...................... 137/99, 101.31, 98, 137/625.6; 91/461, 309, 310; 251/304; 222/57; 60/583, 563; 417/401, 550, 349, 398, 245

[56] References Cited

U.S. PATENT DOCUMENTS

| | | | |
|---|---|---|---|
| 681,807 | 9/1901 | Moon | 417/550 |
| 1,163,724 | 12/1915 | Weld | 417/401 |
| 1,991,595 | 2/1935 | Creveling | 417/245 X |
| 2,096,733 | 10/1937 | Corydon | 137/98 |
| 2,238,747 | 4/1941 | Ornstein | 137/99 |
| 2,308,712 | 1/1943 | Peterson et al. | 60/563 X |
| 3,260,212 | 7/1966 | Johnson | 137/99 X |
| 3,301,236 | 1/1967 | Bratton | 251/304 X |
| 4,108,205 | 8/1978 | Hawley | 137/625.66 X |
| 4,276,001 | 6/1981 | Holmes | 137/99 X |

FOREIGN PATENT DOCUMENTS 1291054 9/1972 United Kingdom ................ 417/398

Primary Examiner—Martin P. Schwadron
Assistant Examiner—Stephen M. Hepperle
Attorney, Agent, or Firm—Murray Schaffer

[57] ABSTRACT

There is provided a proportioning system for mixture of the fluid to a liquid-carrying main line in a substantially constant, presettable proportion to the flow rate of the liquid in the main line. The system comprises pump means for drawing a quantity of fluid from a vessel and for injecting the quantity into the main line, pump-drive means impactable by the main-line liquid for driving the pump means, flowmeter means for monitoring the instantaneous flow rate of the main line and converting the flow rate into a flow-rate proportional rotary motion of an output member of a flowmeter means. The system further comprises pilot-valve means for converting rotary motion into trains of substantially square-wave-like liquid pressure pulses of a frequency dependent on the flow-rate proportional rotary motion, and control-valve means, acted upon via the pilot-valve means by the liquid-pressure pulses, for alternatingly passing liquid from the main line to the pump-drive means, and permitting return of the liquid from the pump-drive means to the control-valve means.

5 Claims, 7 Drawing Figures

LIQUID PROPORTIONING SYSTEM

The present invention relates to a proportioning system for the admixture of a fluid to a liquid-carrying main line in a constant, presettable proportion to the flow rate thereof.

One of the great advantages of modern irrigation systems such as drip irrigation is the possibility of adding to the irrigation water such substances as liquid fertilizer or the like. However, in order to avoid either under-or overfertilizing, the added substance quantities must stand in a certain, fixed ratio to the irrigation water quantities. Now, since the rates of flow of irrigation main lines are anything but constant, being affected by fluctuating water reservoir levels, total loads on irrigation networks etc., maintaining such a fixed ratio obviously requires two conditions: (a) continuous monitoring of flow rates and (b) dispensing of the additive in dependence on the flow rates as measured.

Such instrumentation is known and has been used before. Yet apart from being complex, very expensive and, especially under field conditions, failure-prone, these prior-art devices need an external power source, in this case, electricity, first to obtain, and suitably amplify, continuous signals from a flowmeter monitoring main-line flow, and then to translate these signals, again electrically, into action of control members dispensing the additive as a function of the rate of irrigation water flow.

It is one of the objects of the present invention to overcome these and other disadvantages and drawbacks, and to provide a proportioning system for the constant-ratio admixture of a fluid additive to a liquid-carrying main line that is simple, inexpensive and reliable even under severe field conditions and, above all, requires no extraneous energy source, all functions, i.e., monitoring, controlling, proportioning and dispensing being sustained by the liquid pressure in the main line.

This the present invention achieves by providing a proportioning system for the admixture of a fluid to a liquid-carrying main line in a substantially constant, presettable proportion to the flow rate thereof, comprising pump means adapted in a first working stroke, to draw a quantity of said fluid from a vessel and, in a second working stroke, to inject said quantity into said main line;

pump-drive means mechanically coupled to said pump means, impactable by said main-line liquid and adapted to drive said pump means at least during one of said working strokes;

flowmeter means for monitoring the instantaneous flow rate of said main line and converting said flow rate into a flow-rate-proportional rotary motion of an output member of said flowmeter means;

pilot-valve means for converting said rotary motion into trains of substantially square-wave-like liquid-pressure pulses of a frequency dependent on said flow-rate-proportional rotary motion;

control-valve means, acted upon by said liquid-pressure pulses, for alternatingly passing liquid from said main line to said pump-drive means, and permitting return of said liquid from said pump-drive means to said control-valve means, wherein the fluid quantity drawn during said first working stroke is presettable by adjusting the length of said stroke, and wherein the frequency of injection of said preset fluid quantity is determined by the flow rate of said main line as monitored by said flowmeter means.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 2:
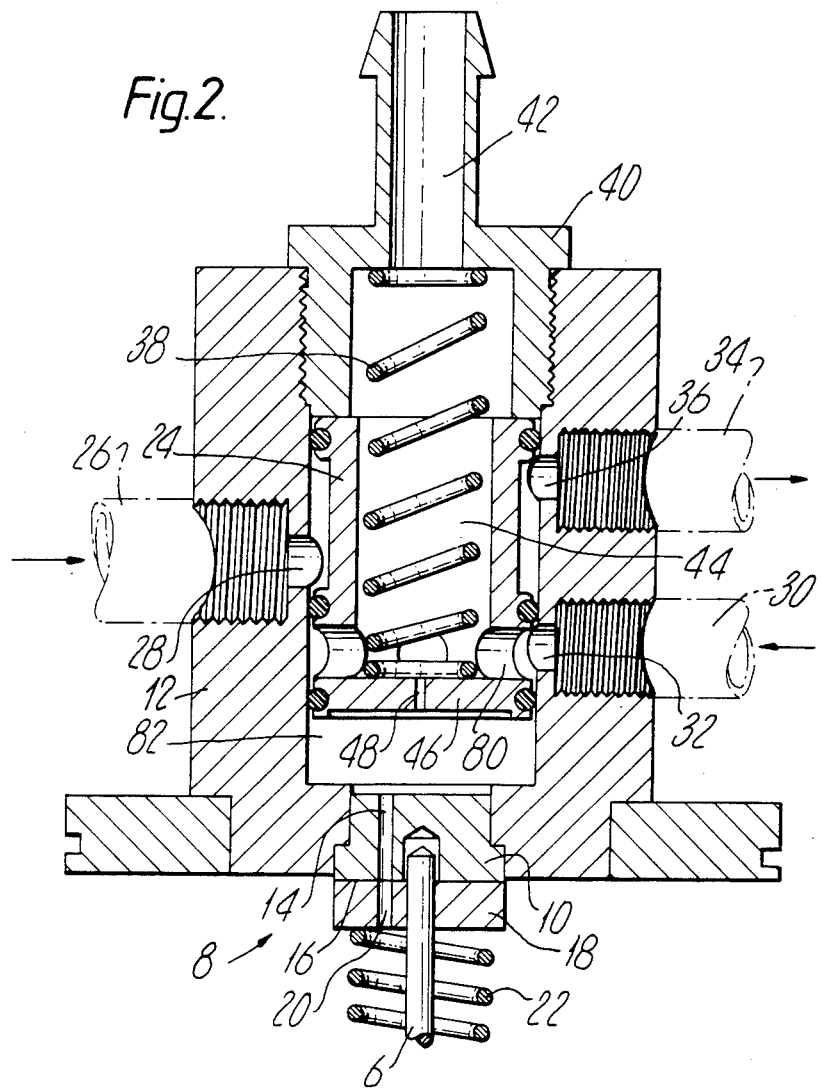
Figure 3:
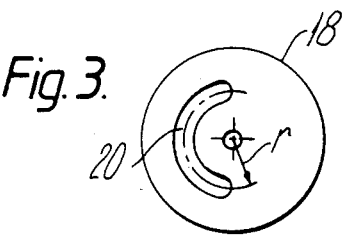
Figure 4:
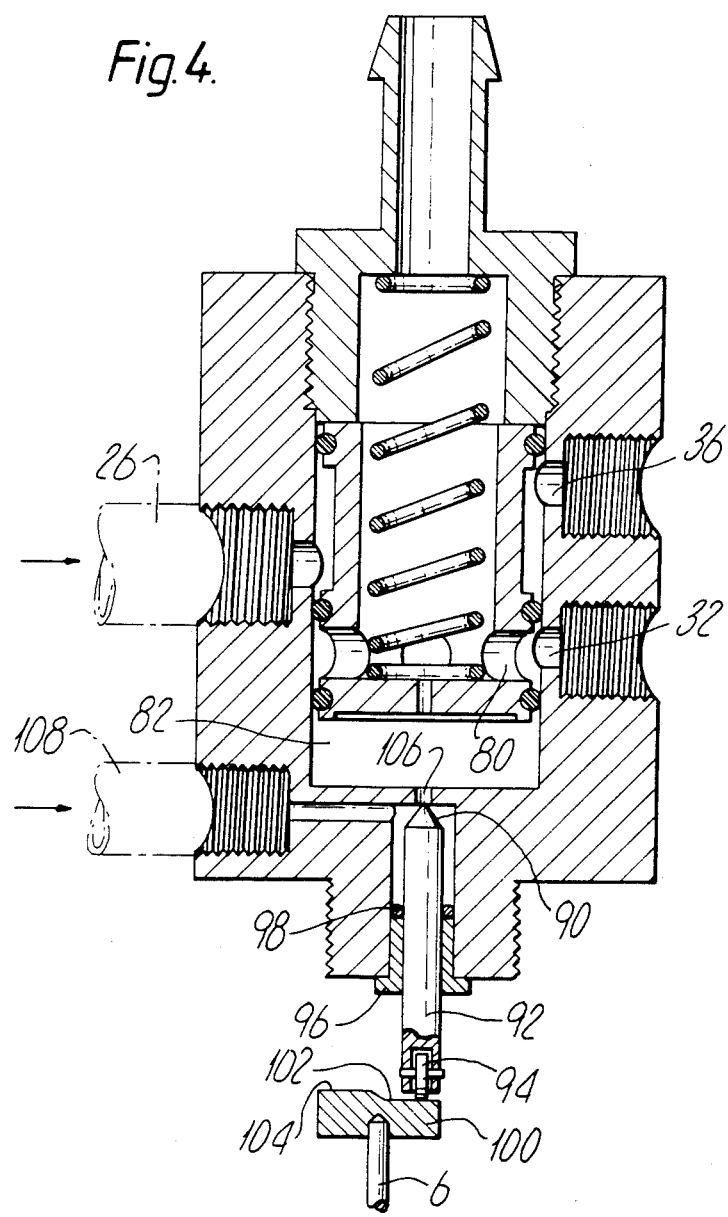
Figure 5:
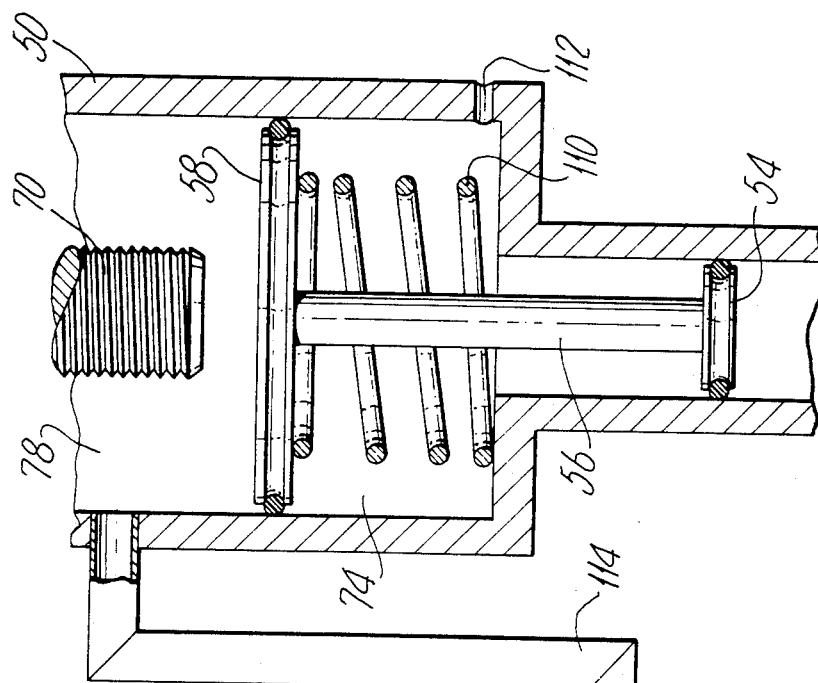
Figure 5:
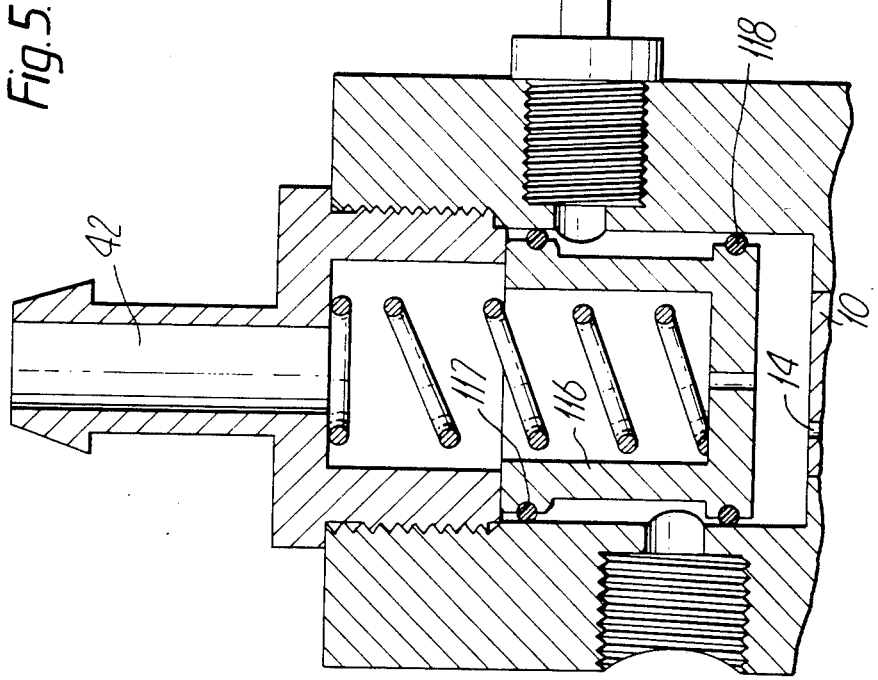
Figure 6:
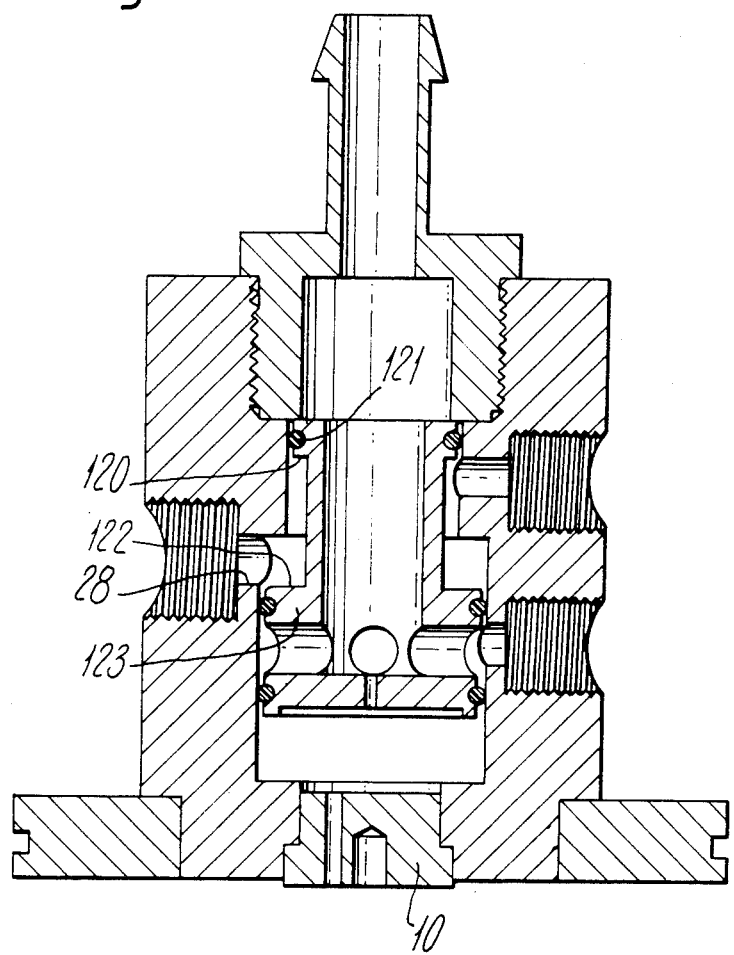
Figure 7:
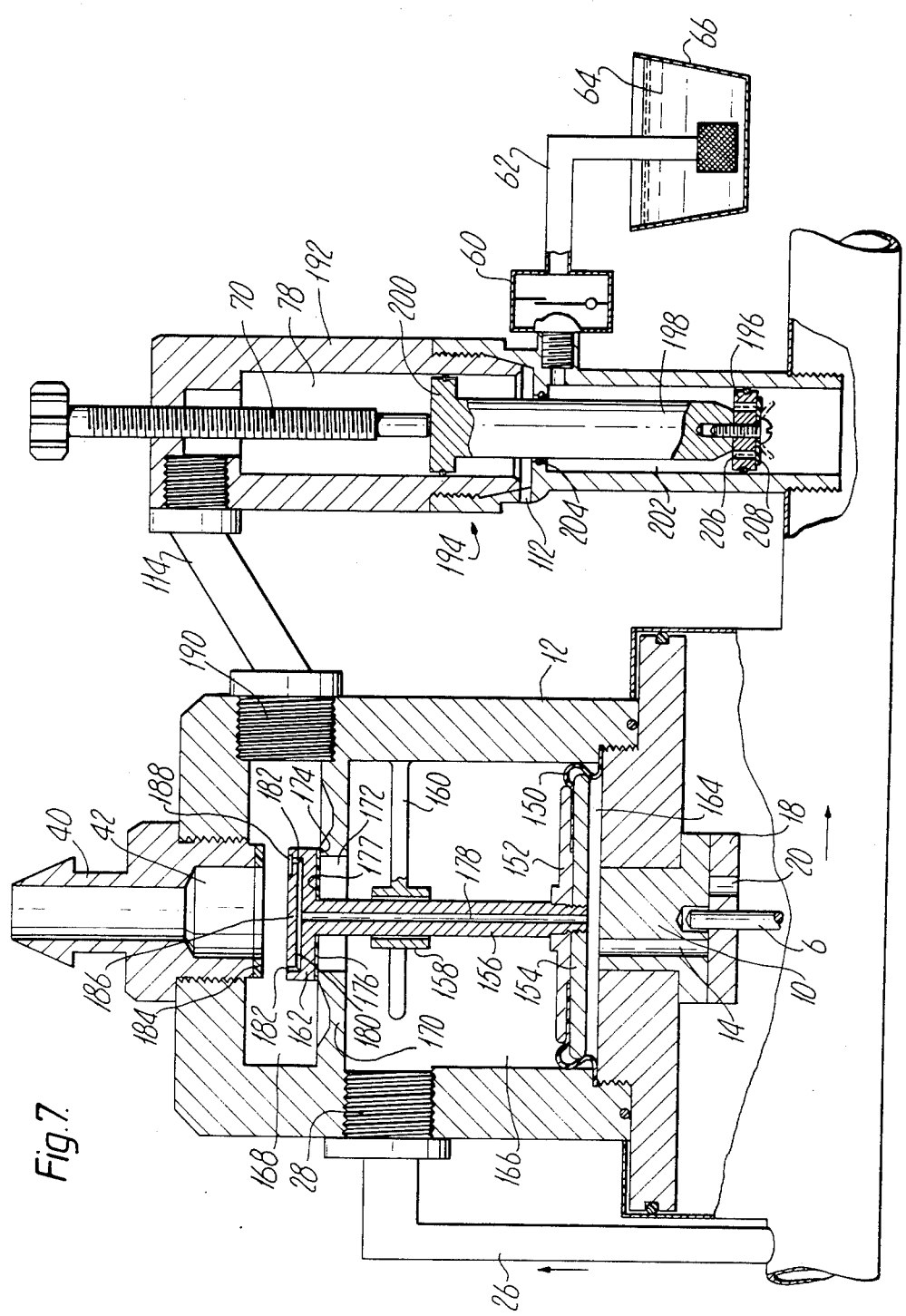

In the drawings: FIG. 1 is a schematic illustration of a preferred embodiment of the system according to the invention; FIG. 2 is a cross section, to a larger scale, of the pilot-and control-valve unit of FIG. 1; FIG. 3 is a top view of the rotatable pilot-valve disc of the embodiment of FIG. 1; FIG. 4 shows another embodiment of the pilot valve; FIG. 5 is a schematic representation of another embodiment of the system according to the invention; FIG. 6 includes a cross-sectional view of yet another embodiment of the control-valve spool, and FIG. 7 is a schematic illustration of still another embodiment of the system according to the invention.

Referring now to the drawings, there is seen in FIG. 1 a water-carrying main line 2 in which is located a flowmeter 4 comprising a rotor 6 which can be of any of the known types—straight vane, helical vane, turbine, etc. Obviously, there is no need for a counter, the task of the flowmeter being only to continuously monitor the rate of flow in the main line 2 and to produce a rotary output that is proportional to the instantaneous flow rate of the main line 2. Whatever flowmeter type is used, the rotary output must be available on a vertical shaft 6 which drives a pilot valve 8 whose function is to convert this flow-rate-dependent rotary motion into trains of square-wave-like water-pressure pulses of a frequency dependent on the rotary motion of the shaft 6, that is, on the flow rate.

The pilot valve 8 of this preferred embodiment, seen to better advantage in FIG. 2, is a shear-type disc valve and consists of a stationary disc 10 press-fitted into a housing 12 and provided with an eccentrically located, round bore 14. The lower face 16 of this stationary disc 10 is in sliding contact with a rotatable disc 18 fixedly attached to the output shaft 6 of the flowmeter 4. This rotatable disc 18 is provided with a circular slot 20 (see FIG. 3) of a width equal to the diameter of the eccentric bore 14 and a mean radius r equal to the eccentricity of the bore 14. The slot 20 subtends an angle of about 180°. In other embodiments this angle may be a different submultiple of 360, say 90°, in which case there would be two oppositely located slots 20. Water from the main line 2 is allowed to pass through the bore 14 when the latter is within the angular range of the circular slot 20 of the rotating disc 18, and is cut off when the bore 14 is outside of this angular range. In the present embodiment, in which this angular range is 180°, water can pass the bore 14 for half a revolution of the output shaft 6 and is cut off for the other half revolution. To take up any axial play of the output shaft 6 and ensure proper contact between the stationary disc 10 and the rotating disc 18, a soft spring 22 is provided, shown only in FIG.

2. Friction between the discs is kept to a minimum by making them of low-friction materials such as, e.g., Teflon.

The square-wave-like water-pressure pulses thus produced by the pilot valve 8 at a frequency directly depending on the flow rate of main line 2 impact a spool-type control valve 24 slideable in the housing 12 between a first position, shown in FIG. 1, in which the spool valve 24 establishes communication between a main-line-fed supply line 26 via a supply port 28, and a first control line 30, via a first control port 32—and a second position, shown in FIG. 2, in which the supply line 26 is connected to a second control line 34 via a second control port 36. The spool valve 24 is biased towards its first position (FIG. 1) by a helical spring 38. The upward stroke of the spool valve 24 is limited by a plug 40 with a bore 42 venting the inside space 44 to the atmosphere. The bottom 46 of the spool valve 24 is provided with a small bleeder opening 48, the purpose of which will be explained further below.

The control lines 30, 34 lead into the housing 50 of a positive-action, variable displacement pump unit 52 comprising a pump piston 54 rigidly connected by a connecting rod 56 to a drive piston 58. Via an inlet valve 60 and a suction line 62, the pump piston 54, actuated by the drive piston 58, draws in a first working stroke a quantity of fluid 64, say liquid fertilizer, from a vessel 66 and, in a second working stroke, injects this quantity into the main line 2, via an outlet valve 68. The quantity drawn in each first stroke and injected in each second stroke depends obviously on the length of the strokes, which is presettable by means of an adjusting screw 70 serving as an upper stop of the drive piston 58 and lockable by means of a locking nut 72.

Starting from an arbitrary position, say that shown in FIG. 1, the system is seen to work as follows:

The spool valve 24 is at its first, lowermost position, in which the supply line 26 is connected to the first control line 30, and the circular slot 20 of the rotating disc 18 is already below the eccentric bore 14. Water has therefore been entering the space 74 of the pump housing 50, acting on both the underside of the drive piston 58 and the upper side of the pump piston 54. Since, however, the impacted surface area of the drive piston is larger—the drive piston 58 having a larger diameter—the entire unit: pump piston 54/drive piston 58 has moved upwards, until stopped by the adjusting screw 70. During this upwards movement, which constituted also the first working stroke of the pump piston 54, the latter has drawn a quantity of fertilizer 64, which now fills the space 76 below the pump piston 54. During the upward stroke of the drive piston 58, the water-filled space 78 above the piston 58 has been reduced, the displaced water returning via the second control line 34 to the control valve and being vented to the atmosphere via the venting bore 42. (While this vented water quantity is usually regarded as a loss, it should be pointed out that it never exceeds 1% of the main-line output and is more likely to be about 0.1%.

At this stage, the circular slot 20 of the rotating disc 18 has again appeared below the bore 14 and water can now enter the control-valve housing 12 in direction of arrow A, impacting the bottom 46 of the spool valve 24, lifting it against the restoring force of spring 38. Here it should be noted that although some of the water impacting the bottom 46 is lost to the atmosphere through the bleeder opening 48, the latter is very small compared to the surface of the pilot-valve bore 14, therefore the lifting capacity is hardly affected. As soon as the spool valve 24 has attained its upper, second position as shown in FIG. 2, the following happens:

The connection is now established between the supply line 26 and the second control line 34, as well as between the first control line 30 and the venting bore 42 (via exhaust ports 80). Consequently, water will now rush via control line 34 into the space 78, impacting the drive piston 58 and forcing it down, thereby causing the pump piston 54 to inject into the main line 2 the previously drawn liquid fertilizer in space 76. On its way down, the drive piston 58 also forces some of the water from space 74 into the first control line 30, whence it is vented to the atmosphere (via exhaust ports 80, space 44 and venting bore 42).

As soon as the circular slot 20 of the continuously rotating disc 18 has moved out of alignment with the bore 14 of the stationary disc 10 of the pilot valve 8, the flow of water into the control valve is cut off. The restoring spring 38 can now force the spool valve 24 down to its first position, the water in space 82 (FIG. 2) being displaced via the bleeder opening 48 and thence, via the bore 42, into the atmosphere. Having fully returned to its first position, the spool valve 24 now awaits the reappearance, below the eccentric bore 14, of the circular slot 20 in the rotating pilot-valve disc 18, signifying the rise of the next pressure square wave, which initiates the next cycle: water rushes into the space 74 (FIG. 1), lifts the drive piston 58 as far as the adjusting screw 70 permits, the pump piston 54 simultaneously drawing liquid fertilizer, and so on.

In the preferred embodiment shown, the pressure required to operate the control valve 24 is taken from inside the flowmeter. With certain flowmeters this might be difficult or even impossible, in which case the embodiment of FIG. 4 offers a solution. Here, the pilot valve is a poppet-type valve comprising a valve cone 90, a valve stem 92, a cam follower in the form of a small roller 94, a guide sleeve 96 and a sealing ring 98. The output shaft 6 of the flowmeter carries in this case a disc in the shape of a face cam 100 which has two camming levels, 102 and 104, providing, in this case, dwell lines of about 180° on each level. When the roller 94 is made to ride up onto the higher level 104, the valve cone 90 closes the passage 106 which, in the open state, permits main-line water from a second supply line 108 to enter the space 82. Return to the lower level 102 is effected by water pressure on the valve.

FIG. 5 shows an embodiment of the system in which the suction stroke of the pump piston 54 is powered by a helical spring 110 which in the preceding injection stroke has been compressed. The space 74 now contains only air, and an air vent 112 prevents pressure build-up in this space. With such an arrangement, only one control line 114 is required and the control valve spool 116, too, becomes simpler, having now only two sealing rims 117, 118, instead of three, there being no need now for the exhuast ports 80 (FIG. 2), the water displaced during the suction stroke from space 78 being ejected from above the spool 116, when the latter is in its first, lowermost position. The disadvantage of this arrangement is the additional pressure required to compress the spring 110.

An arrangement which would dispense with the return spring 38 of the control valve spool 24 (FIGS. 1, 2) is shown in FIG. 6. Here, the annular shoulder 120 of the upper spool lip 121 is narrower than the annular shoulder 122 of the lower spool lip 123, offering therefore a smaller surface area to the water rushing in through the supply port 28 than does the shoulder 122. The spool now functions as a differential piston unit, with a net force always acting to restore the valve spool to its lowermost position.

It is obvious that the pump arrangement shown in FIG. 5, in which the drive piston 58 is spring-loaded can also be combined with a control-valve arrangement such as that shown in FIG. 6, in which the valve spool functions as differential piston, permitting the return spring 38 (FIGS. 1, 2) to be dispensed with.

FIG. 7 shows yet another embodiment of the proportioning system according to the invention, in which the spool-type control valve 24 with its possibly friction-inducing O-ring-type seals is replaced by a completely friction-less arrangement comprising a convoluted elastic diaphragm 150 tightly clamped in its center between an upper and a lower center plate 152 and 154, respectively, and along its edge, between two components of the control-valve housing 12. This embodiment is therefore particularly sensitive and fast-responding to changes and fluctuations in the main-line flow, resulting in increased proportioning accuracy.

The two center plates 152 and 154 are clamped together by the threaded end of a valve stem 156 maintained in its central position by a guide bushing 158 attached to the housing wall by means of arms 160. The valve stem 156 carries at its upper end a flat-seat-type poppet valve 162, a more detailed description of which is given further below.

The interior space of the control-valve housing 12 is divided into three chambers: a first chamber 164 separated from a second chamber 166 by the diaphragm 150, and a third chamber 168 separated from the second chamber 166 by a partition 170 having a central opening 172, the upper rim of which is designed as a seat 174 for a sealing disk 176 attached to the lower surface 177 of the poppet valve 162. The valve stem 156 is provided with a central bore 178 which leads into a horizontal manifold 180 and, thence, into bleeder openings 182. In the valve position shown in FIG. 7, the bore 178 thus connects the chamber 164 with the chamber 168 and, via the vent opening 42, with the atmosphere.

The lower rim of the vent plug 40 is provided with an annular seal 184 against which, in a second position of the valve 162, the upper surface 186 is pressed, sealing off the bleeder openings 182, except for a shallow and narrow groove 188 which, even in the second position of the valve 162, provides a narrow passageway connecting the chamber 164 with the vent opening 42.

The chamber 168 is connected via a control port 190 and a control line 114 to the space 78 of the two-part housing 192 of the pump unit 194 which comprises a pump piston 196 connected by a connecting rod 198 to a drive piston 200. In this embodiment, fluid 64 is drawn in during the downstroke of the pump piston/drive piston unit, rather than in the upstroke as was the case in the previous embodiments. The drawn-in fertilizer fluid 64, filling the space 202 above the pump piston 196 is injected into the main line 2 during the subsequent main-line-pressure powered upstroke of the piston unit, when the space 202 which extends between the upper surface of the pump piston 196 and the O-ring 204 sealing off the connecting rod 198, is progressively reduced, thereby forcing out the fluid 64 through openings 206 in the pump piston 196. During the downstroke of the latter, these openings 206 as sealed off by a discoid elastomer flap valve 208 shown in solid lines in the closed state, and in broken lines in the open state.

In the state shown in FIG. 7, the slot 20 in the rotating valve disk 18 is out of alignment with the bore 14, and the diaphragm 150, no longer under pressure from its underside, has collapsed, the water in chamber 164 having been forced out via bore 178 and bleeder openings 182, the shallow groove 188 permitting the water to escape, even though, in the inflated state of the diaphragm 150, the upper surface of the poppet valve 162 was tightly pressed against the annular seal 184.

The drive piston 200, no longer under main-line pressure in space 78 (which has been cut off by the sealing disk 176), has been forced upward by the main-line pressure acting on pump stem 198, displacing the water in space 78 and expelling it via control line 114, control port 190, chamber 168 and vent opening 42.

As soon as, due to further rotation of the pilot-valve disk 18, communication is reestablished between the slot 20 and the bore 14, the chamber 164 fills up again, pushing the diaphragm 150 and its center disks 152 and 154 up again. This causes the poppet valve 162 to be unseated from its seat 174 and to be pushed against the annular seal 184.

Communication is now reestablished, via the central opening 172, between the chambers 166 and 168, and main-line pressure, entering chamber 166 via line 26, is now free to enter the drive-piston space 78 via control line 114 and initiate the suction stroke of the pump piston 196.

When, subsequently, the rotating pilot-valve disk 18 again moves the slot 20 out of alignment with the bore 14, main-line pressure in the chamber 166, acting on the diaphragm 150, tends to collapse the latter by forcing out the water in the chamber 164, first slowly via the groove 188 and then, with the poppet valve 162 starting to detach itself from the annular seal 184, more rapidly via the bleeder openings 182. Communication is now progressively established between vent opening 42 and drive-piston space 78, initiating the above-mentioned voiding process associated with the injection stage.

In larger systems, demanding larger strokes of the poppet valve 162, the convoluted diaphragm 150 can be replaced by a rolling diaphragm or by a metal bellows.

It will be evident to those skilled in the art that the invention is not limited to the details of the foregoing illustrative embodiments, and that the present invention may be embodied in other specific forms without departing from the essential attributes thereof, and it is therefore desired that the present embodiments be considered in all respects as illustrative and not restrictive, reference being made to the appended claims, rather than to the foregoing description, and all changes which come with the meaning and range of equivalency of the claims are therefore intended to be embraced therein.

What is claimed is:

1. A proportioning system for the admixture of a fluid to a liquid-carrying main line in a substantially constant, presettable proportion to the flow rate thereof, comprising pump means adapted, in a first working stoke, to draw a quantity of said fluid from a vessel and, in a second working stroke, to inject said quantity into said main line;

pump-drive means mechanically coupled to said pump means, impactable by said main-line liquid and adapted to drive said pump means during one of said working strokes;

flowmeter means for monitoring the instantaneous flow rate of said main line and converting said flow rate into a flow rate proportional rotary motion of an output member of said flowmeter means;

pilot-value means for converting said rotary motion into trains of substantially square-wave-like liquid-pressure pulses of a frequency dependent on said flow-rate-proportional rotary motion;

control valve means receiving fluid from said main line and having a single conduit communicating with said pump drive means, said control-valve means actuated in response to, said pilot-valve means to alternatingly pass liquid from said main line via said single conduit to said pump-drive means, and permitting return of said liquid from said pump-drive means via said single conduit to said control-valve means, wherein the fluid quantity drawn during said first working stroke is presettable by adjusting the length of said stroke, and the frequency of injection of said preset fluid quantity is determined by the flow rate of said main line as monitored by said flowmeter means and, wherein said drive piston is resiliently biased in the second working stroke by the pressure of said fluid in said main line and said drive piston is impacted on its stop-means-side face only, supplying the force for said first working stroke, said force also overcoming said bias.

2. The proportioning system as claimed in claim 1, wherein said pump means is a positive-action, variable displacement pump constituting an integral unit with said pump-drive means and comprising a pump piston slideable between a first, fixed position and a second, adjustable position, a drive piston rigidly connected to said pump piston, having a diameter larger than the diameter of said pump piston and being impactable by said liquid-pressure pulses on at least one of its faces, and wherein said second, adjustable position of said pump piston is set by means of a lockable adjusting screw constituting a stop means for said drive piston to abut against.

3. The proportioning system as claimed in claim 1, wherein said pump means further comprises an inlet and an outlet valve.

4. The proportioning system as claimed in claim 1, wherein said pilot-valve means is a shear-type disc valve comprising a stationary disc provided with an eccentrically located bore, one of the faces of which stationary disc is in sliding contact with a rotatable disc fixedly attached to said output member of said flowmeter, which rotatable disc is provided with at least one circular slot of a width substantially equal to the diameter of said bore, of a mean radius substantially equal to the eccentricity of said bore and subtending an angle of an approximate submultiple of 180°, which disc valve permits said main-line liquid to pass when the bore in said stationary disc is within the angular range of the circular slot in said rotatable disc and cuts off said main-line liquid when said bore is outside of said angular range.

5. The proportioning system as claimed in claim 1, wherein said control-valve means is a flat-seat, convoluted diaphragm-controlled poppet valve movable in a vented housing between a first position towards which it is urged by main-line pressure acting on the outside surface of said convoluted diaphragm, and a second position towards which it is urged by said liquid-pressure pulses acting on the inside surface of said convoluted diaphragm.

* * * * *